United States Patent
Goralski, Jr. et al.

(10) Patent No.: US 6,823,843 B1
(45) Date of Patent: Nov. 30, 2004

(54) SYSTEM AND METHOD TO MINIMIZE THE AMOUNT OF NOX RELEASED FROM A NOX TRAP

(75) Inventors: Christian T. Goralski, Jr., Ypsilanti, MI (US); Joseph R. Theis, Rockwood, MI (US); Gopichandra Surnilla, West Bloomfield, MI (US); Justin A. Ura, Livonia, MI (US); Hungwen Jen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/757,947

(22) Filed: Jan. 13, 2004

(51) Int. Cl.[7] .................................................. F02M 7/00
(52) U.S. Cl. .................... 123/435; 123/568.11; 123/704
(58) Field of Search ................................ 123/435, 672, 123/676, 704, 568.11

(56) References Cited

U.S. PATENT DOCUMENTS

| | | |
|---|---|---|
| 6,195,987 B1 | 3/2001 | Miyashita |
| 6,497,092 B1 | 12/2002 | Theis |
| 6,751,947 B2 * | 6/2004 | Lewis et al. .................. 60/277 |

FOREIGN PATENT DOCUMENTS

EP    1067277    12/2002

* cited by examiner

Primary Examiner—Bibhu Mohanty
(74) Attorney, Agent, or Firm—Allan J. Lippa (57) ABSTRACT

A method is described for controlling lean and rich operation of an internal combustion engine coupled to a lean NOx trap. In one example, the termination of the lean air-fuel mixture is based on an oxygen storage capacity and temperature of the NOx trap. In another example, the level and duration of rich air-fuel ratio purging operation is also controlled based on the oxygen storage capacity of the NOx trap.

21 Claims, 9 Drawing Sheets

SYSTEM AND METHOD TO MINIMIZE THE AMOUNT OF NOX RELEASED FROM A NOX TRAP

The present application incorporates by reference, in its entirety and for all purposes, the entire contents of Ser. No. 10/756,876, filed Jan. 13, 2004, assigned to the same assignee as the present application, titled, "SYSTEM AND METHOD TO MINIMIZE THE AMOUNT OF NOx EMISSIONS BY OPTIMIZING THE AMOUNT OF SUPPLIED REDUCTANT".

BACKGROUND AND SUMMARY OF THE INVENTION

In vehicles having an internal combustion engine with an emission control device, NOx traps are often used to decrease the amount of NOx released in the exhaust. The amount of NOx in the exhaust may be elevated when an engine is operating lean. Lean operation improves fuel economy by reducing the pumping losses and improving thermodynamic efficiency. However, the exhaust from such an engine may contain large amounts of excess oxygen for extended periods of time, and thus increase the amount of NOx in the emissions system. In other circumstances, feedgas NOx generation can decrease in lean operation, depending on the operating conditions. These conditions of extended lean operation can affect $NO_x$ conversion of three way catalysts.

To control the NOx emissions during lean operation emission control devices capable of storing NOx during lean operating conditions (lean NOx traps) can be used. Periodically, as the NOx capacity of the NOx trap is approached, the air-fuel ratio (A/F ratio) can be driven to a rich condition for a few seconds in order to purge the trap of stored NOx and to regenerate the NOx storage capacity of the trap.

While lean NOx traps can provide high conversion of NOx under such lean/rich cycling conditions, the catalyst system should also provide high conversion of HC, CO, and NOx when the A/F ratio is controlled about stoichiometry, for example during high load operation. If the close-coupled catalysts contain low amounts of oxygen storage capacity (OSC), the ability of these catalysts to convert CO and NOx under the oscillatory A/F conditions characteristic of closed-loop control systems may be limited. Therefore, the NOx trap itself may contain some OSC in order to provide high CO and NOx conversion under these conditions.

The inventors herein have recognized a disadvantage of including cerium in a lean NOx trap to provide OSC. Cerium may cause some of the stored NOx to be released from the trap during the purges without being reduced to $N_2$. This purge NOx release, without conversion, may be particularly evident at temperatures of 350° C. and above, and may increase as the amount of stored NOx on the lean NOx trap is increased. A major source of this purge NOx release may be attributed to the exotherm that results from the reaction between the reductants in the exhaust (HC, CO, and $H_2$) and oxygen from the cerium. This exotherm heats up the local area of the washcoat around the cerium site, including any NOx storage sites nearby. Since the oxygen from the cerium has consumed the reductants, the released NOx may not be reduced, but rather can be emitted from the trap into the exhaust and out the tailpipe. Another possibility is that the oxygen released from the ceria competes with the released NOx for the reductants. As a result of this competition, some of the NOx may not be reduced but can be emitted from the tailpipe.

Thus, the inventors herein have recognized that a disadvantage of emission control systems whose rich purging is based on lean NOx trap storage efficiency or storage capacity is that the amount of NOx released in tail pipe emission may still be too high, and specifically, that this purged NOx may be at least partially attributed to the element providing OSC within the NOx trap.

The above disadvantage can be overcome by a method for controlling an engine having an exhaust with an emission control device capable of storing NOx during lean operating conditions, and at least partially converting said NOx during stoichiometric or rich operating conditions, comprising:

operating the engine to produce a lean exhaust gas mixture fed to the emission control device;

calculating an amount of NOx stored in the device based on operating conditions;

determining a NOx storage limit value, said value determined as a function of device temperature and an amount of oxygen storage capacity of the device; and ending said engine operation producing said lean exhaust gas mixture when said amount of NOx stored reaches said limit value.

Thus, the inventors herein have recognized that the NOx emitted from a NOx trap during rich purging may be further minimized by limiting the amount of NOx stored during lean operating conditions to a level that is a function of the trap temperature and the trap OSC. Note that the limit value may be a lower amount than the maximum storage capacity or an amount calculated to satisfy a predetermined lean storage efficiency. Purging the trap when it reaches this limit of stored NOx can thus minimize the emitted NOx during purges.

In another aspect, the above disadvantage can be overcome by a computer storage medium having instructions encoded therein for controlling an engine having an exhaust with an emission control device capable of storing NOx during lean operating conditions, and releasing and at least partially converting said NOx during stoichiometric or rich operating conditions, said medium comprising:

code for operating the engine to produce a lean exhaust gas mixture fed to the emission control device;

code for calculating an amount of NOx stored in the device based on operating conditions;

code for determining a NOx storage limit value, said value determined as a function of device temperature and an amount of oxygen storage capacity of the device; and code for ending said engine operation producing said lean exhaust gas mixture when said amount of NOx stored reaches said limit value.

By utilizing these encoded instructions, it is possible to minimize the purge NOx release that is not converted by purging the NOx trap when the amount of stored NOx reaches a limit value determined by the trap's temperature and OSC. Also note that at least some NOx is converted, in some cases, it is desirable to attempt to convert and much NOx as possible.

Further, the inventors herein have also recognized that several factors influence the amount of purge NOx release from the NOx trap, including the amount of NOx stored, the OSC of the trap, the trap temperature, and the amount of reductant supplied during the purge. All these factors can be considered in the effort to reduce the amount of emitted NOx. Thus, the inventors have discerned that NOx trap purging can be improved when the engine operates to produce a rich air-fuel exhaust ratio selected to provide a level of reductant dependent on the trap temperature and the trap OSC.

BRIEF DESCRIPTION OF THE DRAWINGS

The advantages described herein will be more fully understood by reading examples of embodiments in which the invention is used to advantage, with reference to the drawings, wherein.

DESCRIPTION OF EXAMPLE EMBODIMENT(S)

Figure 1:
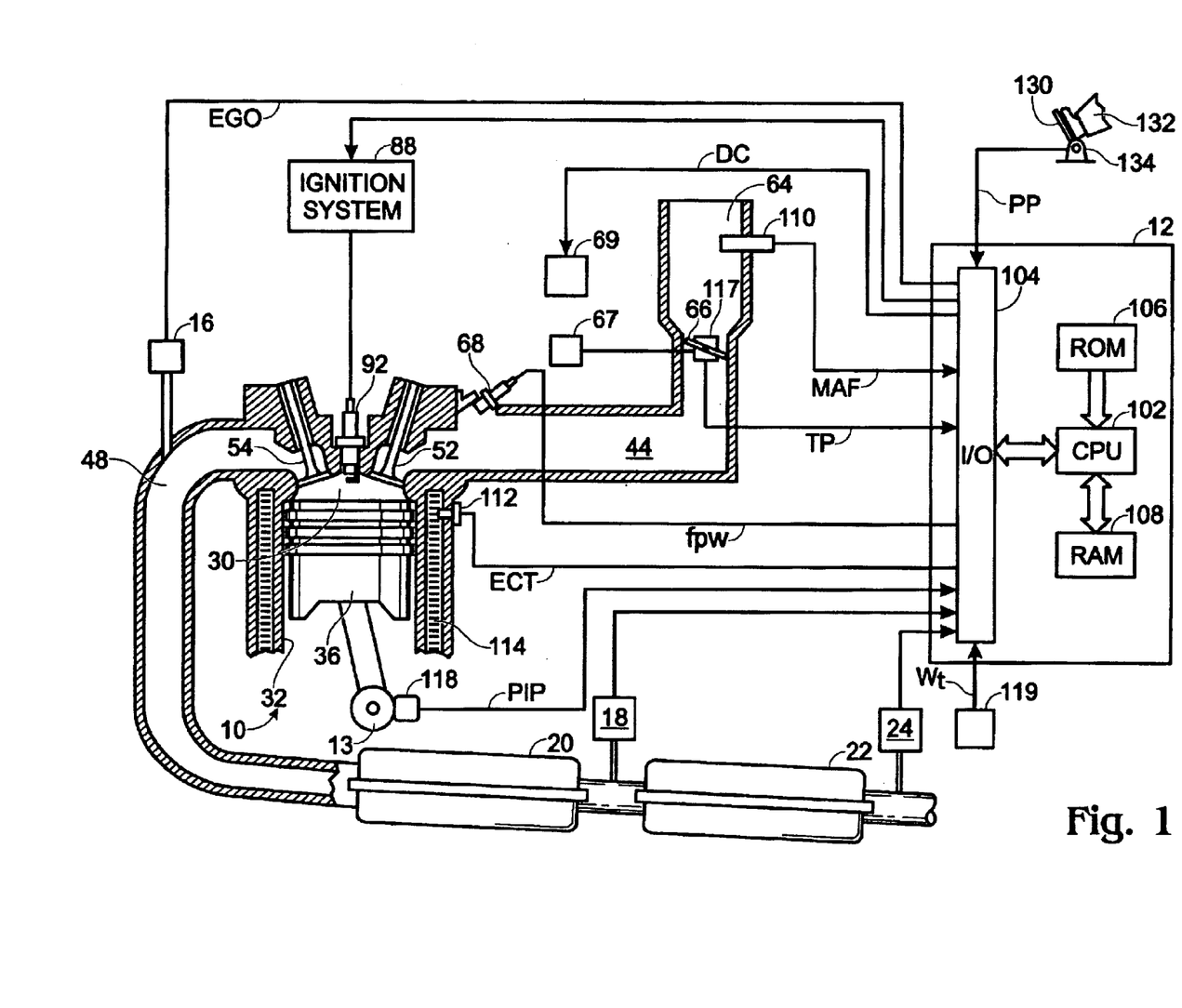
FIG. 1 is a block diagram of an engine in which the invention is used to advantage.

Referring to FIG. 1, an internal combustion engine 10 may include at least one emission control device capable of storing NOx during lean operating conditions. The device can include a washcoat having ceria, barium, platinum, rhodium, palladium, oxides thereof, combinations thereof, and/or sub-combinations thereof. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20. A HEGO, UEGO, or exhaust gas NOx sensor 18 is coupled to the exhaust manifold 48 upstream of NOx trap 22, and a second HEGO, UEGO, or NOx sensor 24 is coupled to manifold 48 downstream of NOx trap 22.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a fuel system (not shown) including a fuel tank, fuel pump, and fuel rail (not shown).

Engine 10 further includes distributorless ignition system 88 to provide ignition spark to combustion chamber 30 via spark plug 92 in response to controller 12. In the embodiment described herein, controller 12 is a microcomputer including: microprocessor unit 102, input/output ports 104, electronic memory chip 106, which is an electronically programmable memory in this particular example, random access memory 108, and a data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft (not shown), a profile ignition pickup signal (PIP) from Hall effect sensor 118 coupled to crankshaft 13 indicating and engine speed (N); and an optional sensor to detect feedgas NOx concentration (not shown).

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 2:
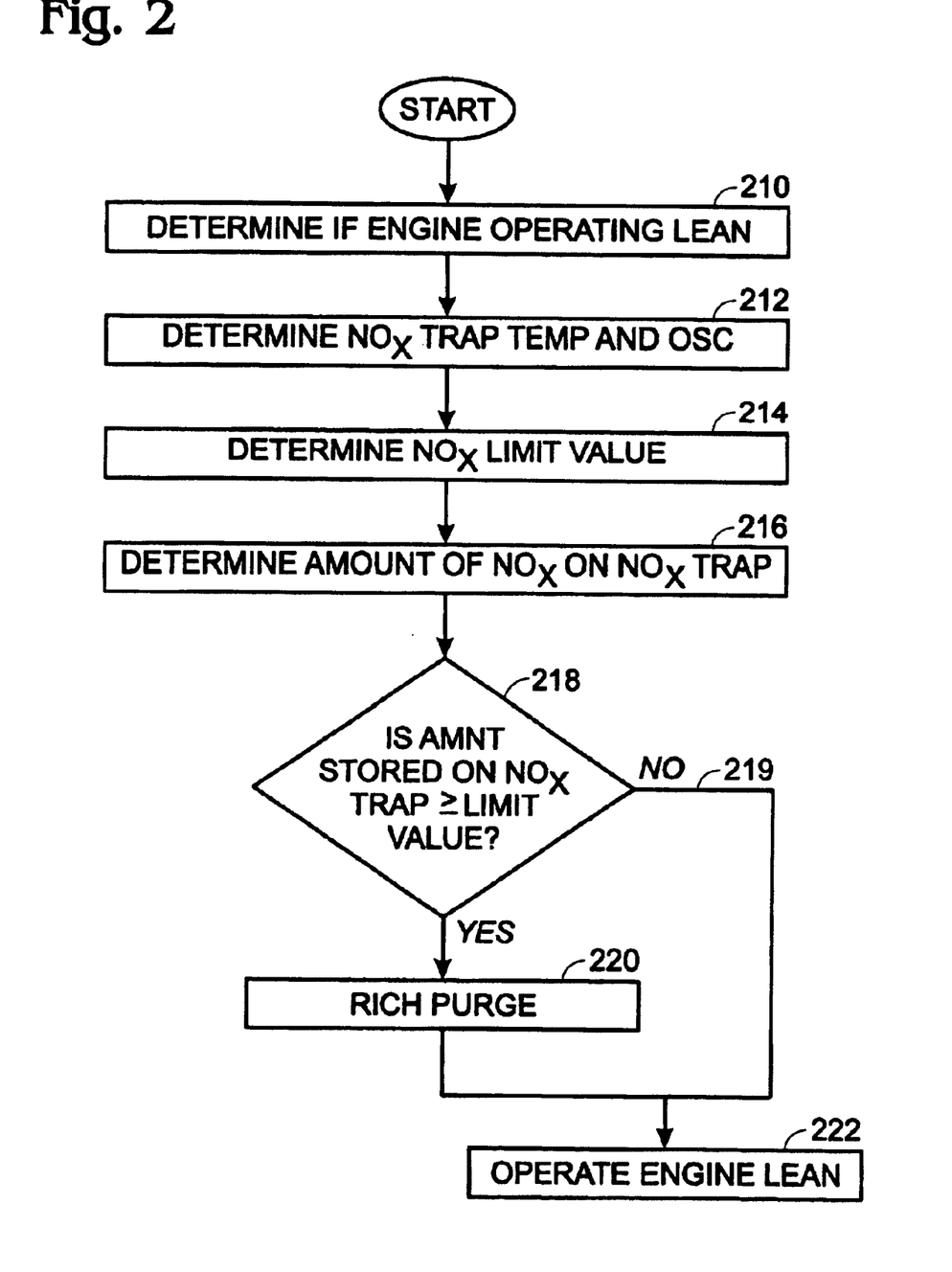
FIGS. 2–4 are exemplary routines for controlling an engine having an emission control device capable of storing NOx under lean operating conditions.

Referring now to FIG. 2, a routine is described for controlling an engine having an emission control device capable of storing NOx under lean operating conditions such as a NOx trap. First, in step 210, the routine determines if the engine is operating under lean conditions. For example, the routine determines whether the engine is operating at an A/F ratio greater than the stoichiometric mixture of 14.6 to 1.

Next, in step 212, the routine determines the temperature of the NOx trap and the OSC of the NOx trap. These can be determined in a variety of ways. The temperature may be measured using a thermocouple or estimated from a temperature model, and the amount of OSC trap can be estimated from the difference in switch times during the rich-to-lean transition. Then, in step 214, the routine determines a limit value based on the NOx trap temperature and OSC. The routine determines, or estimates, the amount of NOx stored on the NOx trap in step 216.

Then, in step 218, the routine compares the amount of NOx stored on the trap to the limit value. If the amount stored is less than the limit value, in step 219 the routine continues to operate the engine under lean conditions in step 222.

Alternatively, if the amount stored is greater than or equal to the limit value, the routine goes onto step 220 where a rich purge occurs. During the purge of step 220 the engine operates under rich conditions for a duration of time (such as a time period, or a duration terminated via feedback from an exhaust gas sensor, for example). For example, the engine may operate at an A/F ratio less than the stoichiometric mixture of 14.6 to 1 to provide a level of reductant to the NOx trap for a period of time. Following the purge, in step 222 the engine returns to lean operation. Optionally, the engine can return to a stoichometric A/F ratio, depending on the torque required from the engine.

In this way, the routine allows more effective NOx emission control during lean engine operation and/or during the rich purges.

Figure 3:
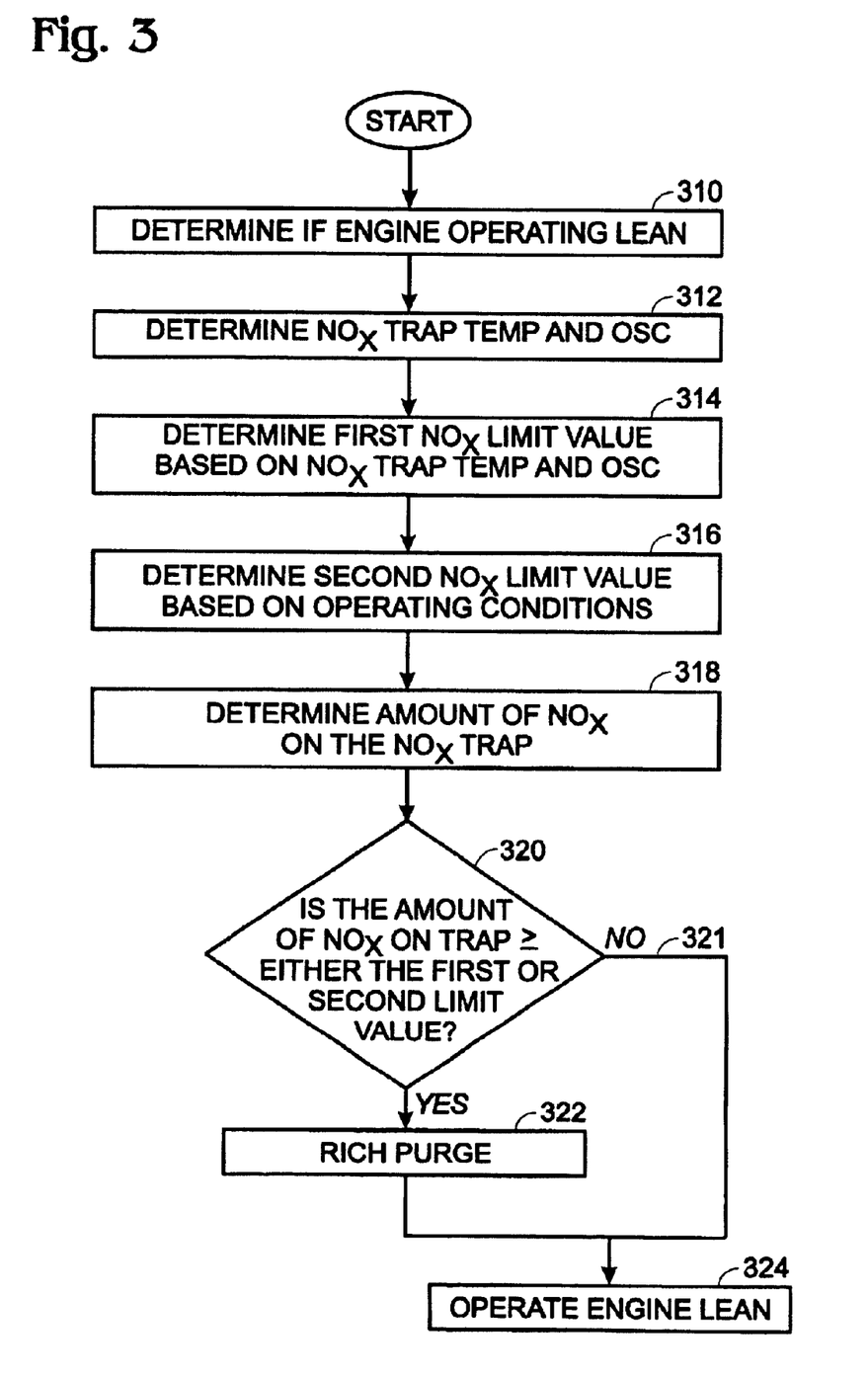

Referring now to FIG. 3, an alternative routine is described for controlling an engine having a NOx trap. In step 310, the routine determines if the engine is operating under lean conditions. In step 312, the routine determines the temperature of the NOx trap and the OSC of the NOx trap, and in step 314 the routine determines a first limit value based on the NOx trap temperature and OSC. Continuing on to step 316, the routine determines a second limit value based on operating conditions. In one example, the second limit value can be a maximum amount of NOx storage based on a NOx capacity of the device. Alternatively, it can be a maximum amount of NOx storage to provide a given NOx tailpipe emission. Still other options are also possible. Then, in step 318, the routine determines the amount of NOx stored on the NOx trap.

In step 320 the routine compares the amount of NOx stored on the trap with both the first and the second NOx limit values. If the amount of NOx stored is less than both the first and second limit values, the routine follows step 321 and continues to operate the engine under lean conditions at routine step 324. Alternatively, if the amount of NOx stored is greater than or equal to either the first or the second limit value, the routine proceeds to step 322 and a rich purge occurs. Following the rich purge the routine follows step 324 and resumes lean engine operation.

Figure 4:
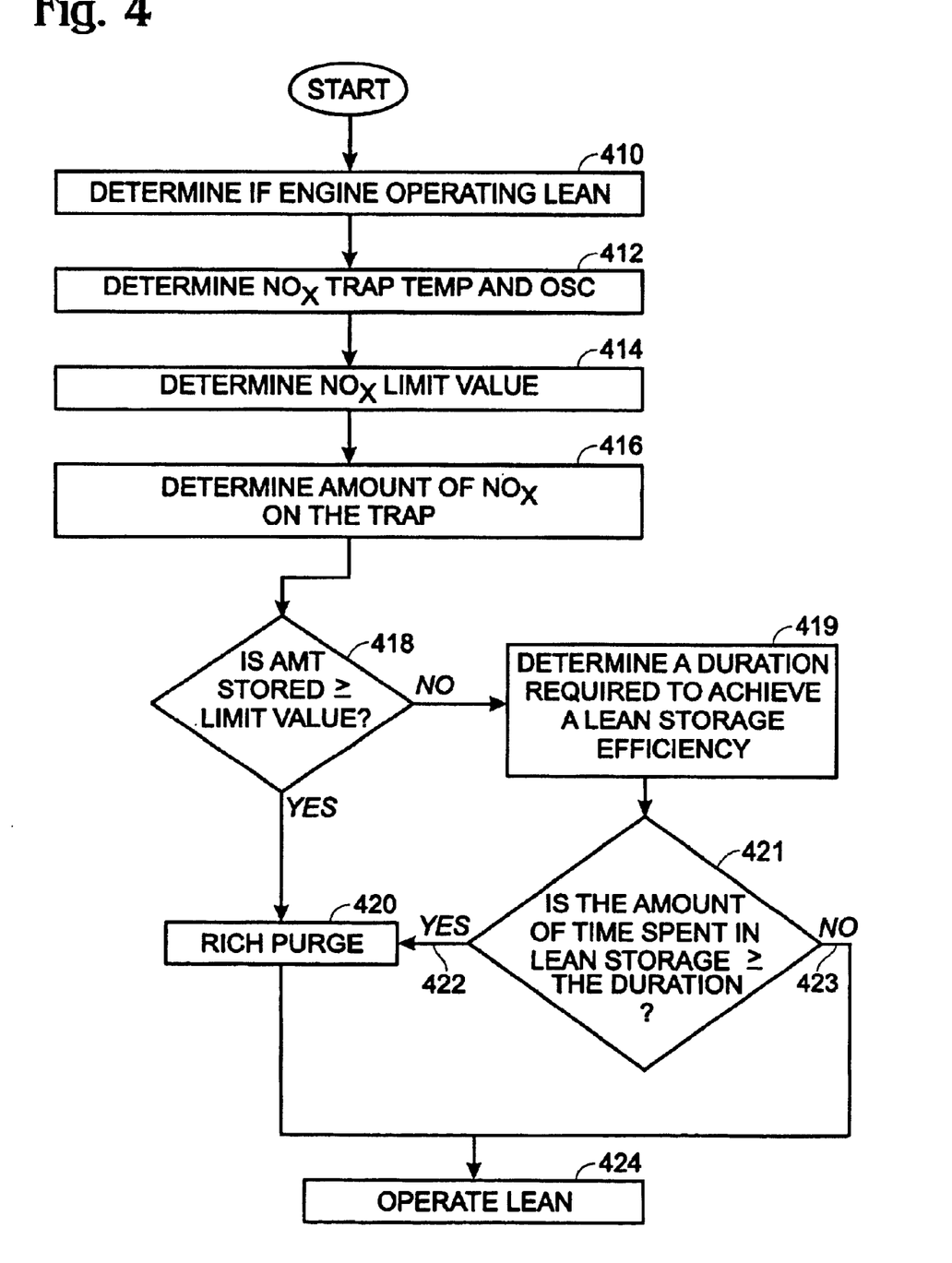

FIG. 4 describes yet another routine for controlling an engine having a NOx trap. First, in step 410, the routine determines whether an engine is operating under lean conditions. Next, in step 412, the routine determines the temperature of NOx trap and the OSC of the NOx trap. Then, in step 414, the routine determine a limit value based on the NOx trap temperature and OSC.

In step 416 the routine determines the amount of NOx stored on the NOx trap. Then, in step 418, the routine compares this amount stored on the NOx trap with the limit value. If, as in FIG. 2 above, the amount of stored NOx is greater than or equal to the limit value then in step 420 a rich purge occurs where the engine operates under rich conditions for a duration of time before returning to lean operating condition in step 424.

Alternatively, if at step 418 the stored NOx is less than the limit value, in step 419 the routine continues on to determine a duration of lean storage period required to satisfy a predetermined NOx trap lean storage efficiency. This duration of lean storage may be determined in various ways, such as a time duration, or a number of engine cycles, or based on feedback from a sensor. A diagnostic control strategy may be used that controls the duration of the lean storage periods in order to satisfy a predetermined lean storage efficiency of the NOx trap (e.g., 90% or 95%).

One possible way to control to a desired lean storage efficiency is to use the measured flow rate and the response from a NOx sensor mounted downstream of the lean NOx trap to calculate the cumulative amount of NOx emitted from the NOx trap during the lean period. The cumulative amount of NOx in the feedgas during the lean period also needs to be calculated from the measured flow rate and the feedgas NOx concentration, which can be determined from either a second NOx sensor mounted upstream of the NOx trap or from a lookup table of NOx concentration as a function of speed, load, EGR rate, and spark timing. From the cumulative amounts of feedgas NOx and the tailpipe NOx, the cumulative lean storage efficiency can be calculated. When the cumulative storage efficiency matches the desired lean storage efficiency, a rich purge can occur.

Another method that can be used to control to a desired lean storage efficiency is to monitor the difference in time for a pre-NOX trap HEGO sensor and a post NOx trap HEGO sensor to switch following the lean-to-rich transition during a purge. This difference in switch time is proportional to the amount of NOx and oxygen that is released from the NOx trap. The delay due to the release of oxygen can be estimated from the difference in switch time between the two sensors during the rich-to-lean transition following the purge and by assuming that the delay from oxygen release during the lean-to-rich transition is equal to the delay due to oxygen storage during the rich-to-lean transition. Therefore, by subtracting the difference in switch time during the rich-to-lean transition from the difference in switch time during the lean-to-rich transition, the difference in switch time during the lean-to-rich transition that is due solely to NOx stored can be calculated. The amount of feedgas NOx from the engine during the previous lean period can be calculated in a manner described in the previous paragraph. Therefore, the overall lean storage efficiency for the previous lean cycle can be calculated. The duration of the subsequent lean period can be incrementally lengthened or shortened if this calculated efficiency is greater than or less than the desired lean storage efficiency.

Note that a switch time is just an example approach, and other approaches can be taken, such as using a calculation of storage parameters calculated from the sensors and other operation conditions. Alternatively, the oxygen storage can be estimated from an index or switch ratio of an upstream and downstream HEGO, or during a lean-to-rich transition after a short lean period.

Continuing with FIG. 4, in step 421 the routine then determines if the amount of time spent with the engine operating in lean conditions is greater than the desired duration of lean storage to satisfy the predetermined efficiency. Again, other durations can be used, and it is not necessary that a time-based approach be used. If the lean operation period is longer, in step 422 the routine progresses to a rich purge. If the lean period is not longer than the duration required to meet the predetermined lean storage efficiency of step 419, in step 423 the routine continues to operate the engine under lean conditions. Thus, in the routine of FIG. 4 a rich purge occurs if either the amount of stored NOx is greater than the limit value, or if the duration of time the engine has operated under lean conditions exceeds the duration of lean storage period required to satisfy a predetermined lean storage efficiency.

In this manner, the lean duration can be shortened as the LNT loses NOx storage efficiency due to thermal deactivation or due to sulfur poisoning. The lean duration can also be increased if the LNT gains NOx storage efficiency, such as after a desulfation.

As a result of these approaches, the amount of NOx that can be stored in the LNT to achieve the desired lean storage efficiency can be found. Regardless of the approach to control to the desired lean storage efficiency, the amount of OSC in the trap can be estimated from the difference in switch times during the rich-to-lean transition. Further, it can be estimated based on calculations of the amount of oxidants and reductants entering the trap as determined from exhaust gas sensor and the mass air flow sensor. The bed temperature of the LNT can be measured using a thermocouple or estimated from a temperature model. In one example, the bed temperature and the measured amount of OSC can be used with the data from FIG. 14 to determine the amount of NOx that can be stored to limit the NOx release to 1.5 mg/in3. If the amount of NOx storage required to minimize the NOx release is less than the amount of NOx that can be stored to achieve the desired lean storage efficiency, then the lean period is terminated when the amount of NOx storage matches the amount determined from FIG. 14 (discussed below), even though the trap could continue to store NOx with the desired storage efficiency. On the other hand, if the amount of NOx storage allowed to achieve the desired lean storage efficiency is less than the amount of NOx storage required to minimize the NOx release, then the duration of the lean period is determined based on the amount required to achieve the desired lean storage efficiency. In other words, in one example approach, the lean period is terminated by either the NOx release consideration or the NOx storage efficiency consideration, whichever comes first.

For traps containing ceria, it is expected that the NOx release criteria can determine the duration of the lean storage periods when the trap is relatively new and the OSC is at its highest level. Since the lean storage periods are shorter than those allowed to achieve the desired lean storage efficiency, the storage efficiencies will be higher than the desired efficiency. However, after the trap has been aged for many miles and the OSC of the trap has decreased, the lean storage efficiency requirement can be the limiting factor in determining the duration of the lean storage periods.

The inventors have performed a number of experiments on NOx traps. These experimental results revealed the relationships between NOx trap temperature, NOx trap OSC and the amount of NOx emitted during a purge that can be used to advantage in the control routines discussed above. FIGS. 5–14 demonstrate these experimental results and show data that can be advantageously used to achieve improved performance.

Figure 5:
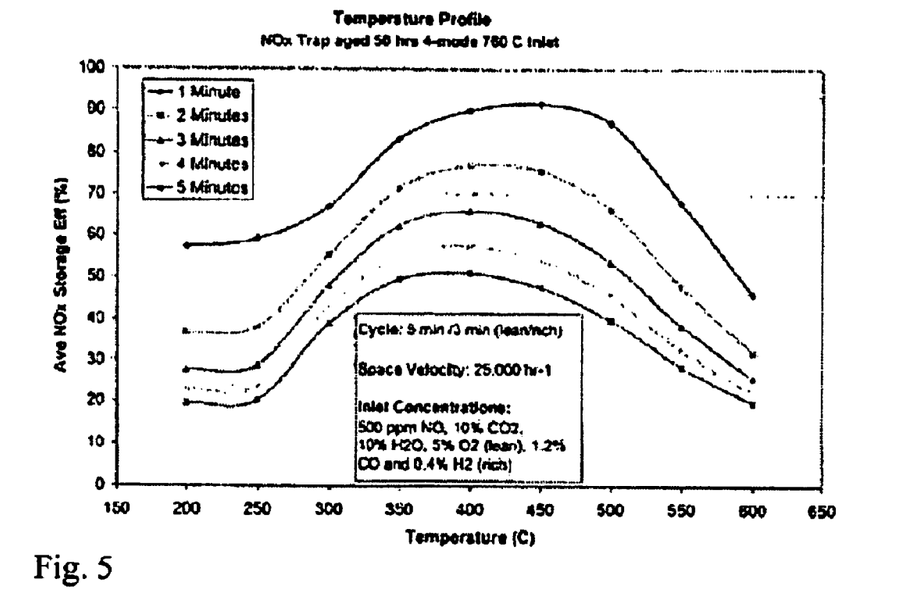
FIGS. 5 through 14 are graphs of experimental results involving NOx emissions.

FIG. 5 shows NOx storage efficiency of a thermally aged NOx trap for various times at different temperatures. The storage efficiencies were averaged over 1, 2, 3, 4, and 5 minutes of lean operation for a thermally aged lean NOx trap when evaluated on a five minute lean/3 minute rich test cycle. The peak Nox storage performance occurred around 400° C. to 450° C. and dropped off at lower and higher temperatures.

Figure 6:
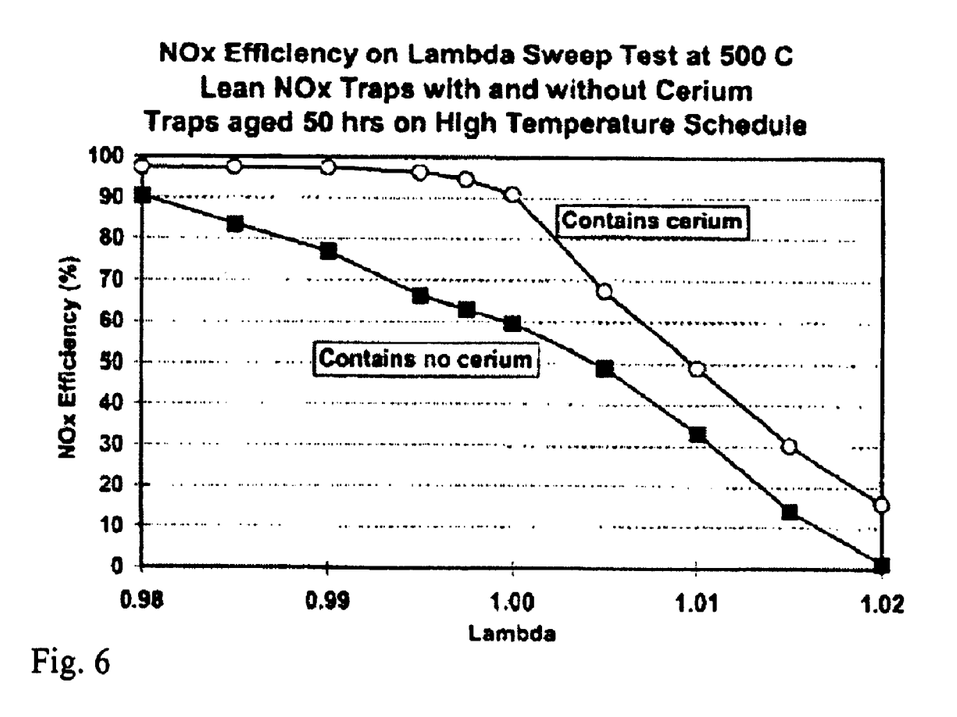

FIG. 6 demonstrates the NOx efficiency versus lambda value at 500° C. for NOx traps with and without cerium after high temperature aging. This graphical depiction reveals that a NOx trap containing cerium had better NOx conversion at stoichiometry (lambda=1.0) than a trap without cerium after the traps were aged on a high temperature schedule with maximum temperatures near 1000° C. Therefore, the NOx trap itself can contain some OSC in order to provide high CO and NOx conversion under stoichiometric conditions. This can be achieved using ceria, ceria oxide, or another oxygen storage agent.

Figure 7:
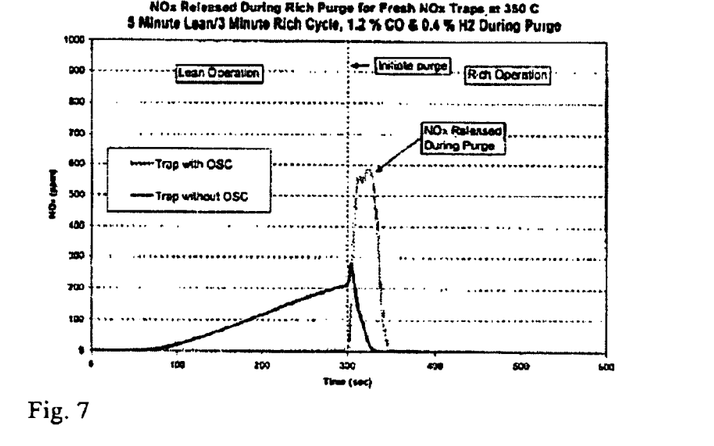
Figure 8:
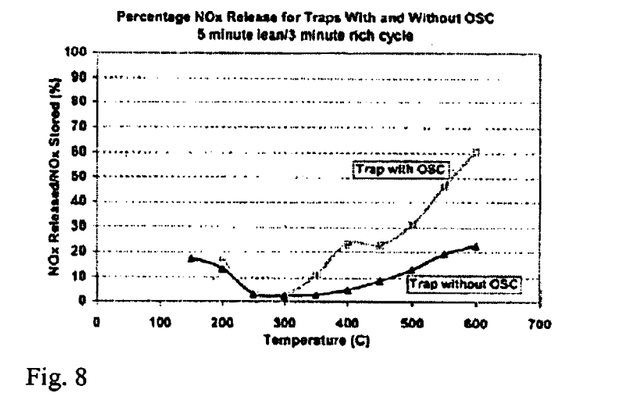

FIGS. 7 and 8 further show the performance effects of including OSC in a NOx trap. These figures depict the results from experiments comparing the purge NOx release for a stabilized trap with no oxygen storage capacity and a stabilized trap containing oxygen storage capacity. FIG. 7 shows that, when these traps were evaluated at 350° C. using a 5 minute lean/3 minute rich cycle, the trap without OSC was less effective at storing NOx during the 5 minute lean period, but it exhibited much less NOx release during the purge than the trap containing OSC. FIG. 7 indicates that the purge NOx release may depend on the oxygen storage capacity of the NOx trap.

As such, since the percentage of NOx release may depend on the temperature and the oxygen storage capacity of the trap, it may be possible to improve results by controlling the amount of NOx stored in order to reduce the NOx release, depending on the temperature and the amount of OSC in the NOx trap.

FIG. 8 shows the percent NOx release at different temperatures for the NOx traps with and without OSC. In this experiment, the amount of NOx stored during the lean period and the amount of NOx released during the rich period were calculated, and the amount of NOx release was then determined as a percentage of the amount of NOx stored. For both NOx traps, the percent NOx release generally increased as the temperature increased beyond 350° C. As can be seen, the trap with OSC had a significantly higher percentage of NOx release than the trap without OSC at these higher temperatures.

Figure 9:
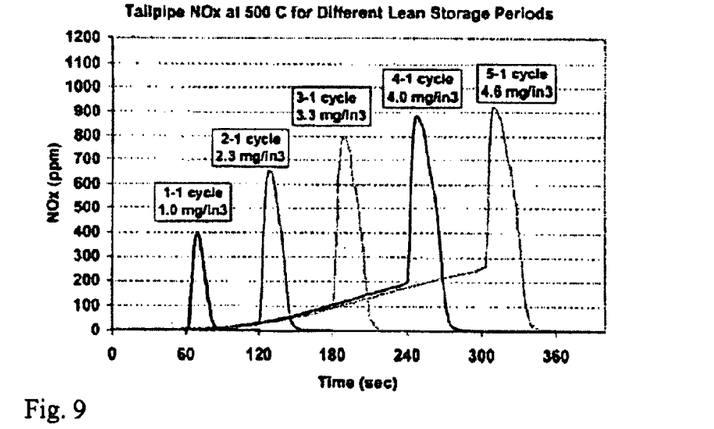

FIG. 9 shows the results of an experiment where a NOx trap pre-conditioned at 600° C. was evaluated for NOx storage and NOx release at 500° C. using test cycles with a rich period of one minute but with lean periods of 1, 2, 3, 4, and 5 minutes. The NOx emitted from the NOx trap during the rich purges that followed these cycles of different lean storage periods are graphed, and the text box above each curve indicates the test cycle as well as the amount of NOx released during the purge (normalized by the volume of the sample). The amount of NOx release decreased as the lean storage period decreased, which corresponded to decreasing amounts of NOx storage. Thus, the amount of purge NOx release can be decreased by shortening the lean storage period; in other words, by using only part of the NOx storage capacity of the trap.

Figure 10:
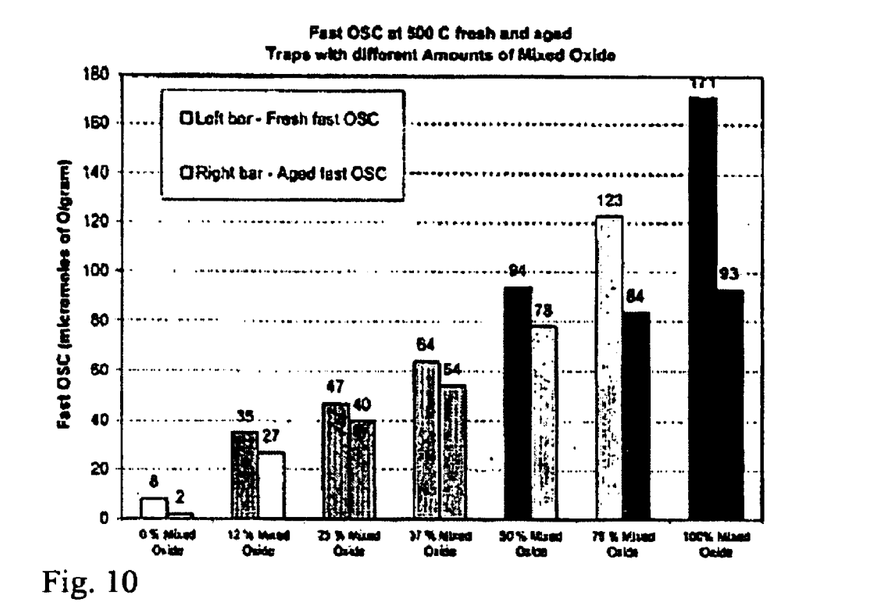

To quantify the amounts of NOx storage allowed to minimize the purge NOx release, studies were performed on NOx traps that contained different amounts of a ceria-containing mixed oxide. After stabilization at 600° C., samples of these traps were evaluated for oxygen storage capacity at different temperatures. The sample was reduced for 30 seconds in 1% CO and then oxidized for 30 seconds in 0.5% O2. The total OSC was determined from the amount of oxygen taken up during the 30 second lean period and normalized by the weight of the sample. The "fast" OSC was defined as the amount of oxygen taken up by the trap before any breakthrough of oxygen occurred. Oxygen storage tests were also performed on samples of these traps that had been aged for 50 hours on a high temperature aging cycle with maximum temperatures of 1000° C. FIG. 10 shows the fast OSC results for the fresh and aged samples at 500° C. (different shades are used in the figure to categorize samples with similar fast OSC results).

Figure 11:
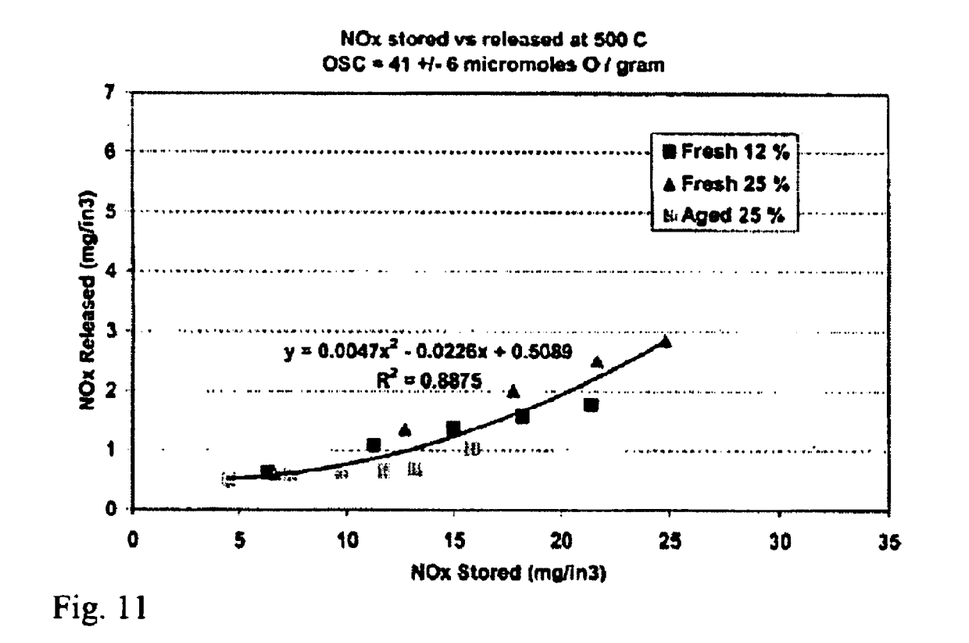
Figure 12:
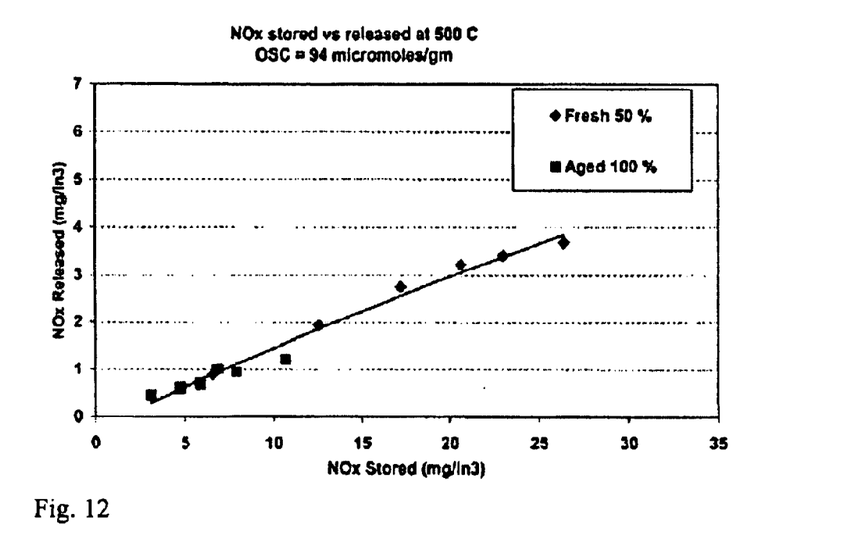

Samples of the traps stabilized at 600° C. were further evaluated for NOx storage and NOx release at 500° C. by utilizing the 1/1, 2/1, 3/1, 4/1, and 5/1 cycles (lean/rich times in minutes). The A/F ratio during the rich purges was held constant at approximately 14.1 to 1, and the amounts of NOx storage and NOx release were calculated for the different cycles. Some of the thermally aged samples were evaluated on these cycles. The NOx release was plotted as a function of the NOx stored for samples with similar fast OSC levels. As an example, FIG. 11 shows the data for the stabilized sample with 12% mixed oxide and the fresh and thermally aged samples with 25% mixed oxide, which had fast OSC levels averaging around 41 micromoles O/gram of catalyst, and FIG. 12 shows the results for samples with a fast OSC level around 94 micromoles O/gram of catalyst.

Figure 13:
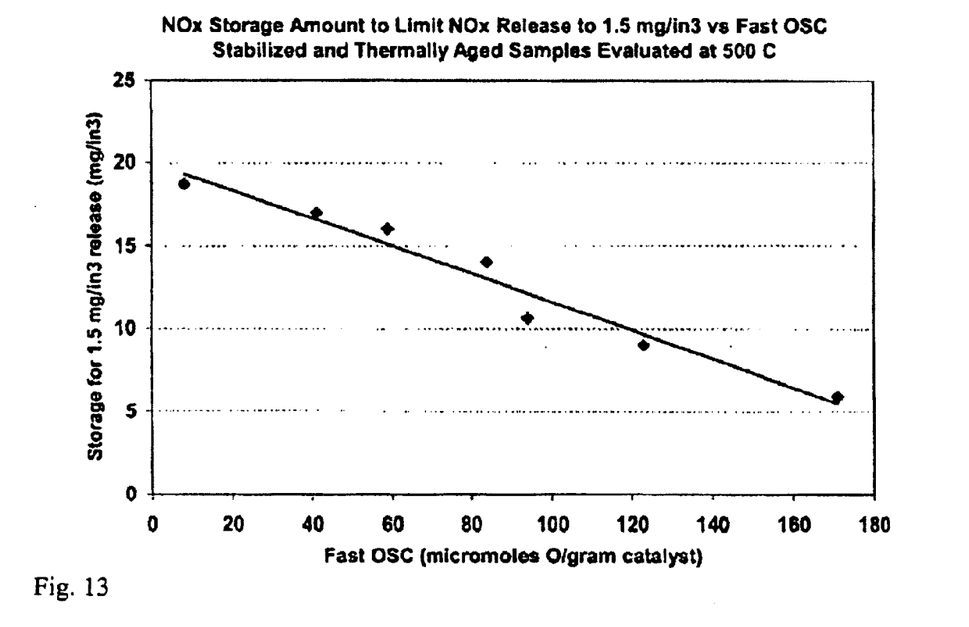

FIG. 13 is a plot which could be used to determine the maximum amount of NOx storage for each level of OSC in order to specify a value of permissible purge NOx release. As an example, a value of 1.5 mg/in$^3$ was selected as the desired limit for the NOx release. For each fast OSC level, the amount of NOx storage that resulted in 1.5 mg/in$^3$ of NOx release at 500° C. was determined and plotted in FIG. 13 as a function of the fast OSC. FIG. 13 shows that, as the fast OSC of the trap increased, less NOx could be stored in order to limit the purge NOx release to 1.5 mg/in$^3$.

Figure 14:
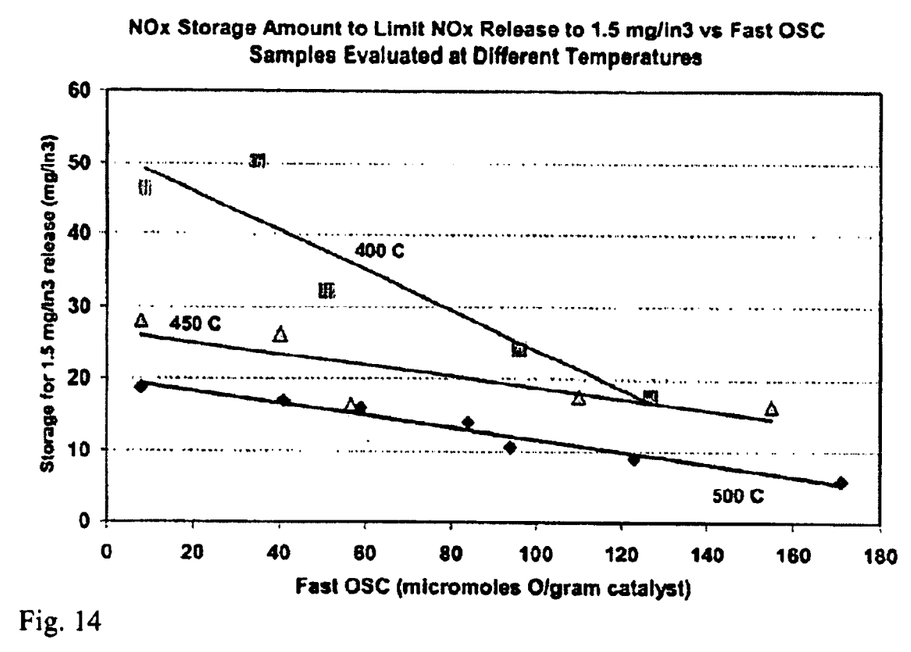

Similar data was collected at 400° C. and 450° C., and these results are shown along with the results at 500° C. in FIG. 14, which can be used in addition to those in FIG. 13 to control engine operation. Less NOx can be released during the purges at these lower temperatures, consistent with the data in FIG. 8. As a result, for a given amount of fast OSC, more NOx could be stored at these temperatures while maintaining a NOx release of 1.5 gm/in$^3$.

As discussed above, this data can be used in the control strategies described in the flow charts. As such, limiting the amount of NOx storage in order to reduce the purge NOx release can be used as part of an overall diagnostic and control strategy to reduce the NOx emissions during the lean storage periods as well as during the rich purges. This approach can be used in conjunction with a diagnostic strategy that controls the duration of the lean storage periods in order to satisfy, for example, a predetermined lean storage efficiency (e.g., 90% or 95%). As discussed in detail above, several different approaches can be used to accomplish this desired lean storage efficiency.

This concludes the description of the invention. The reading of it by those skilled in the art would bring to mind many alterations and modifications without departing from the spirit and the scope of the invention. Accordingly, it is intended that the scope of the invention be defined by the following claims:

We claim:

1. A method for controlling an engine having an exhaust with an emission control device capable of storing NOx during lean operating conditions, and converting at least a portion of said NOx during stoichiometric or rich operating conditions, the method comprising:

operating the engine to produce a lean exhaust gas mixture fed to the emission control device;

calculating an amount of NOx stored in the device based on operating conditions;

determining a NOx storage limit value, said value determined as a function of device temperature and an amount of oxygen storage capacity of the device; and ending said engine operation producing said lean exhaust gas mixture when said amount of NOx stored reaches said limit value.

2. The method of claim 1 wherein said operation is ended even if said device is still capable of storing NOx at high efficiency.

3. The method of claim 1 further comprising, after said ending, operating the engine to produce a rich air-fuel exhaust ratio, with said rich air-fuel ratio selected to provide a level of reluctant dependent on said device temperature and said amount of oxygen storage capacity of the device.

4. The method of claim 1 wherein said emission control device capable of storing NOx is a three-way catalyst including cerium and barium.

5. The method of claim 1 wherein said operating conditions include one or more of a feedgas flow rate, a feedgas NOx concentration, a UEGO sensor reading upstream from an emission control device capable of storing NOx, a UEGO sensor reading downstream from said emission control device, a HEGO sensor reading upstream from said emission control device, a HEGO sensor reading downstream from said emission control device, a NOx sensor reading upstream from said emission control device, and a NOx sensor reading downstream from said emission control device.

6. The method of claim 1 wherein said amount of oxygen storage capacity is determined from the difference in switch times during a rich operating condition and a lean operating condition transition.

7. The method of claim 1 wherein said device temperature is estimated using a temperature model.

8. The method of claim 1 wherein said device temperature is estimated using a thermocouple.

9. A method for controlling the NOx emissions from an engine having an exhaust with an emission control device capable of storing NOx during lean operating conditions, and converting at least a portion of said NOx during stoichiometric or rich operating conditions, the method comprising:

operating the engine to produce a lean exhaust gas mixture fed to the emission control device;

calculating an amount of NOx stored in the device based on operating conditions;

determining a first NOx storage limit value, said value determined as a function of device temperature and an amount of oxygen storage capacity of the device;

determining a second NOx storage limit value based on an operating condition and;

ending said engine operation producing said lean exhaust gas mixture when the amount of NOx stored reaches either the first or second storage limit.

10. The method of claim 9 wherein said operation is ended even if said device is still capable of storing NOx at a high efficiency.

11. The method of claim 9 wherein said operation is ended even if said device is still capable of storing NOx at the desired predetermined lean storage efficiency.

12. The method of claim 9 further comprising, after said ending, operating the engine to produce a rich air-fuel exhaust ratio, with said rich air-fuel ratio selected to provide a level of reluctant dependent on said device temperature and said amount of oxygen storage capacity of the device.

13. The method of claim 9 wherein said emission control device includes a diagnostic system that controls the duration of lean storage periods in order to achieve a desired lean storage efficiency designed to regulate the NOx emissions from the vehicle during both the lean storage periods and the rich purge periods.

14. The method of claim 9 wherein said diagnostic system controls the duration of lean storage periods using one or more of feedgas flow rate, feedgas NOx concentration, NOx sensor reading upstream from an emission control device capable of storing NOx, a HEGO sensor upstream from said emission control device, a HEGO sensor downstream from said emission control device, a UEGO sensor upstream from said emission control device, a UEGO sensor downstream from said emission control device, and NOx sensor reading downstream from said emission control device capable of storing NOx.

15. The method of claim 9 wherein said emission control device capable of storing NOx is a three-way catalyst including cerium and barium.

16. The method of claim 9 wherein said amount of oxygen storage capacity is determined from the difference in switch times during a rich operating condition and a lean operating condition transition.

17. The method of claim 9 wherein said device temperature is estimated using a temperature model.

18. The method of claim 9 wherein said operating conditions include one or more of a feedgas flow rate, a feedgas NOx concentration, a HEGO sensor upstream from an emission control device capable of storing NOx, a HEGO sensor downstream from said emission control device, a UEGO sensor upstream from said emission control device, a UEGO sensor downstream from said emission control device, a NOx sensor reading upstream from said emission control device, and a NOx sensor reading downstream from said emission control device capable of storing NOx.

19. The method of claim 9 wherein the second limit value is based on satisfying a predetermined lean storage efficiency.

20. A computer storage medium having instructions encoded therein for controlling an engine having an exhaust with an emission control device capable of storing NOx during lean operating conditions, and converting at least a portion of said NOx during stoichiometric or rich operating conditions, said medium comprising:

code for operating the engine to produce a lean exhaust gas mixture fed to the emission control device;

code for calculating an amount of NOx stored in the device based on operating conditions;

code for determining a NOx storage limit value, said value determined as a function of device temperature and an amount of oxygen storage capacity of the device; and     code for ending said engine operation producing said lean exhaust gas mixture when said amount of NOx stored reaches said limit value.

21. The medium of claim 20, wherein said code for controlling said engine further comprises code for determining a NOx storage limit value based on a desired predetermined lean storage efficiency and ending said engine operation producing said lean exhaust gas mixture when the amount of NOx stored reaches either said NOx storage limit value determined as a function of device temperature and an amount of oxygen storage capacity of the device, or said NOx storage limit value based on a desired predetermined lean storage efficiency.

\* \* \* \* \*